United States Patent

Shibata et al.

[11] Patent Number: 5,946,413
[45] Date of Patent: *Aug. 31, 1999

[54] IMAGE ANALYZING APPARATUS FOR PRODUCING A PROFILE OF IMAGE DATA

[75] Inventors: Hiromi Shibata; Kunihiro Takahashi, both of Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,488

[22] Filed: Dec. 29, 1995

[30] Foreign Application Priority Data

Jan. 10, 1995 [JP] Japan .................................. 7-002016

[51] Int. Cl.⁶ .............................. H04N 1/409; G06K 9/00
[52] U.S. Cl. ......................... 382/174; 382/264; 358/463
[58] Field of Search ................................ 382/168, 169, 382/174, 189, 199, 263, 264, 132; 358/462–464, 452–453; G06K 9/00; H04N 1/409

[56] References Cited

U.S. PATENT DOCUMENTS

| | | |
|---|---|---|
| 4,731,863 | 3/1988 | Sezan et al. . |
| 4,804,842 | 2/1989 | Nakajima . |
| 5,028,793 | 7/1991 | Lindmayer et al. ................. 250/484.1 |
| 5,243,668 | 9/1993 | Kitamura et al. . |
| 5,463,697 | 10/1995 | Toda et al. ............................ 382/199 |

FOREIGN PATENT DOCUMENTS

| | | | |
|---|---|---|---|
| 59-15843 | 1/1984 | Japan | .............................. G01N 23/20 |
| 61-51738 | 3/1986 | Japan | .............................. H01J 37/22 |
| 61-93538 | 5/1986 | Japan | .............................. H01J 37/20 |
| 1-60782 | 12/1989 | Japan | .............................. G01N 33/58 |
| 1-60784 | 12/1989 | Japan | .............................. G01N 33/60 |
| 4-3952 | 1/1992 | Japan | .............................. C12N 15/00 |
| 2 246 197 | 1/1992 | United Kingdom | ........... G01N 21/76 |

*Primary Examiner*—Kim Yen Vu
*Attorney, Agent, or Firm*—Sughrue, Mion, Zinn, Macpeak & Seas, PLLC

[57] ABSTRACT

An image analyzing apparatus includes a display for displaying an image and an image analyzer including a profile data producing section for producing profile data corresponding to a profile of density in a region specified by a figure formed at a desired position in the image displayed on the display, a noise level data producing section for producing noise level data indicating a level of noise contained in the profile, and a peak recognizing section for smoothing the profile data in accordance with the noise level data and producing peak data regarding peaks contained in the profile based on the smoothed profile data. The display is constituted so as to be able to display the profile. According to the thus constituted image analyzing apparatus, it is possible to automatically and properly recognize peaks in a profile irrespective of noise contained in the image.

5 Claims, 10 Drawing Sheets

IMAGE ANALYZING APPARATUS FOR PRODUCING A PROFILE OF IMAGE DATA

BACKGROUND OF THE INVENTION

The present invention relates to an image analyzing apparatus and, particularly, to such an apparatus which produces a profile of image data corresponding to pixels in a region defined in a displayed image and recognizes a peak in the profile.

DESCRIPTION OF THE PRIOR ART

Various image analyzing methods are known. These include an autoradiographic process comprising the steps of introducing a radioactively labeled substance into an organism, using the organism or a part of the tissue of the organism as a specimen, placing the specimen and a radiographic film such as a high sensitivity type X-ray film together in layers for a certain period of time to expose the radiographic film thereto and obtaining locational information on the radioactively labeled substance in the specimen from the resolved pattern of the radiographic film, a chemiluminescent process comprising the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, detecting the chemiluminescent emission in the wavelength of visible light generated by the contact of the chemiluminescent substance and the labeling substance and obtaining information relating to the high molecular substance such as genetic information, a detecting method using an electron microscope comprising the steps of irradiating a metal or nonmetal specimen with an electron beam, detecting a diffraction image, transmission image or the like and effecting elemental analysis, composition analysis or structural analysis of the specimen, or irradiating the tissue of an organism with an electron beam and detecting an image of the tissue of the organism, and a radiographic diffraction image detecting process comprising the steps of irradiating a specimen with radiation, detecting a radiographic diffraction image and effecting structural analysis of the specimen.

Conventionally, these methods are carried out by employing a photographic film as a detecting material, recording a radiographic image, a chemiluminescent image, an electron microscopic image, a radiographic diffraction image or the like on the photographic film and observing a visual image with the eyes. However, in the case where a photographic film is employed as a detecting material, since a radiographic film has low sensitivity, there is a problem that it takes considerable time for recording an image in the autoradiographic process and the radiographic diffraction image detecting process. Further, in the chemiluminescent process, although it is necessary to employ a highly sensitive film having a high gamma value for detecting very weak chemiluminescent emission, when a highly sensitive film having a high gamma value is employed, it is difficult to expose the film reliably using a straight portion of the characteristic curve. Therefore, the film is often exposed improperly and it is necessary to repeatedly expose film under various exposure conditions. Moreover, in the detecting process using the electron microscope, since the straight portion of the characteristic curve of a photographic film for an electron microscope is short, it is difficult to determine the proper exposure condition and it is necessary to repeatedly expose films. Furthermore, in either processes, it is indispensable to chemically develop the films and, therefore, the operations are unavoidably complicated.

In view of the above, there have been proposed an autoradiographic process, a chemiluminescent process, a detecting process using an electron microscope and a radiographic diffraction image detecting process comprising the steps of employing, as a detecting material for the radiation, the visible light, the electron beam or the like, not a photographic film, but a stimulable phosphor which can absorb and store the energy of radiation, visible light, an electron beam or the like upon being irradiated therewith and release a stimulated emission whose amount is proportional to that of the received radiation, the visible light, the electron beam or the like upon being stimulated with an electromagnetic wave having a specific wavelength range, photoelectrically detecting the stimulated emission released from the stimulable phosphor, converting the detection signal to a digital signal, effecting a predetermined image processing on the obtained image data and reproducing an image on displaying means such as a CRT or the like or a photographic film (See for example, Japanese Patent Publication No. 1-60784, Japanese Patent Publication No. 1-60782, Japanese Patent Publication No. 4-3952, U.S. Pat. No. 5,028,793, UK Patent Application 2,246,197 A, Japanese Patent Application Laid Open No. 61-51738, Japanese Patent Application Laid Open No. 61-93538, Japanese Patent Application Laid Open No. 59-15843 and the like).

According to the detecting processes using the stimulable phosphor, development, which is a chemical processing, becomes unnecessary. In addition, the exposure time can be markedly shortened in the autoradiographic process and the radiographic diffraction image detecting process. Improper exposure becomes rare and the exposing operation becomes easy in the chemiluminescent process and the detecting process using the electron microscope. Further, since the image is reproduced after the detected signal has been converted to a digital signal, the image can be reproduced in a desired manner by effecting signal processing on image data and it is also possible to effect quantitative analysis using a computer. Use of a stimulable phosphor in these process is therefore advantageous.

In the autoradiographic process, the chemiluminescent process and the detecting process using the electron microscope and the radiographic diffraction image detecting process, it is often required for quantitatively analyzing images displayed on a display means such as a CRT to specify a particular image region, one-dimensionally map values of image data corresponding to the density of pixels in the specified region, make a profile based on the result of mapping and display the profile in a window in the screen of the display means. It is particularly useful to make the profile in the case where DNA, RNA, protein or the like is one-dimensionally mapped or distributed for observing positions of the respective bands and the density thereof.

Therefore, an attempt has been made at automatic recognition of the peaks on a profile. In conventional methods, a profile curve corresponding to the profile is differentiated, cross points where the differential curve crosses the zero level are determined and peak points and bottom points on the profile are automatically recognized based on the thus determined cross points.

However, since a profile curve obtained based on an image containing a lot of noise has a lot of fine fluctuation components, namely, many noise components, the curve obtained by differentiation also contains many cross points caused by the noise components and fine peak points and bottom points caused by the noise components are often recognized as peak and bottom points of the profile curve.

Therefore, it has been proposed to recognize peak points and bottom points of a profile curve by first effecting smoothing differentiation on the profile curve and then differentiating the smoothed curve. However, in an image analyzing apparatus using this technique, the operator has to set smoothing parameters suitable for the properties of the individual profile curve and the operations therefore become troublesome.

The same problems occur in the case where, after an autoradiographic image, a chemiluminescent image, an electron microscopic image, a radiographic diffraction image or the like was recorded on a photographic film, the recorded image is photoelectrically read and converted to a digital signal and the thus obtained image signal is signal processed in a desired manner, thereby reproducing a visible image on displaying means such as a CRT or the like or a photographic film.

SUMMARY OF THE INVENTION

It is therefore an object of the present invention to provide an image analyzing apparatus which can automatically and properly recognize peaks in a profile irrespective of noise contained in an image.

The above and other objects of the present invention can be accomplished by an image analyzing apparatus comprising display means for displaying an image, profile data producing means for producing profile data corresponding to a profile of density in a region specified by a figure formed at a desired position in the image displayed on the display means, noise level data producing means for producing noise level data indicating a level of noise contained in the profile, and peak recognizing means for smoothing the profile data in accordance with the noise level data and producing peak data regarding peaks contained in the profile based on the smoothed profile data, the display means being constituted so as to be able to display the profile.

In a preferred aspect of the present invention, the noise level data producing means is constituted so as to produce a differential curve by differentiating a profile curve corresponding to the profile and producing the noise level data based on the number of cross points per unit distance where the differential curve crosses a zero level.

In a further preferred aspect of the present invention, the peak recognizing means is constituted so as to effect smoothing differentiation on the profile curve corresponding to the profile.

In a further preferred aspect of the present invention, the peak recognizing means is constituted so as to recognize peaks by selecting, depending on the noise level data, either method based on a curve produced by effecting smoothing differentiation on the profile curve or based on the differential curve of the profile curve.

In a further preferred aspect of the present invention, the peak recognizing means is constituted so as to select, in accordance with the noise level data, points based on which smoothing differentiation is to be effected on the profile curve.

In a further preferred aspect of the present invention, the image data are produced using a stimulable phosphor sheet.

In a further preferred aspect of the present invention, the image data are constituted by image data selected from a group consisting of autoradiographic image data, radiographic diffraction image data, electron microscopic image data and chemiluminescent image data.

In a further preferred aspect of the present invention, the autoradiographic image data, the radiographic diffraction image data and the electron microscopic image data are produced by absorbing and storing the energy of a radiation or an electron beam emitted from a specimen in a stimulable phosphor, irradiating the stimulable phosphor with an electromagnetic wave and photoelectrically converting light emitted from the stimulable phosphor.

In a further preferred aspect of the present invention, the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

In the present invention, the stimulable phosphor employed for producing an autoradiographic image, a radiographic diffraction image and an electron microscopic image may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}, M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M^{II}FX\ aM^{I}X'\ bM^{'II}X'''_3\ xA:yEu^{2+}$ (where $M^{II}$ is at least one alkaline earth metal selected from the group consisting of Be, Sr and Ca; $M^{I}$ is at least one alkaline metal selected from the group consisting of Li, Na, K, Rb and Cs; $M^{'II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors disclosed in UK Patent Application 2,246,197 A.

The above and other objects and features of the present invention will become apparent from the following description made with reference to the accompanying drawings.

DESCRIPTION OF THE PREFERRED EMBODIMENTS

Figure 1:
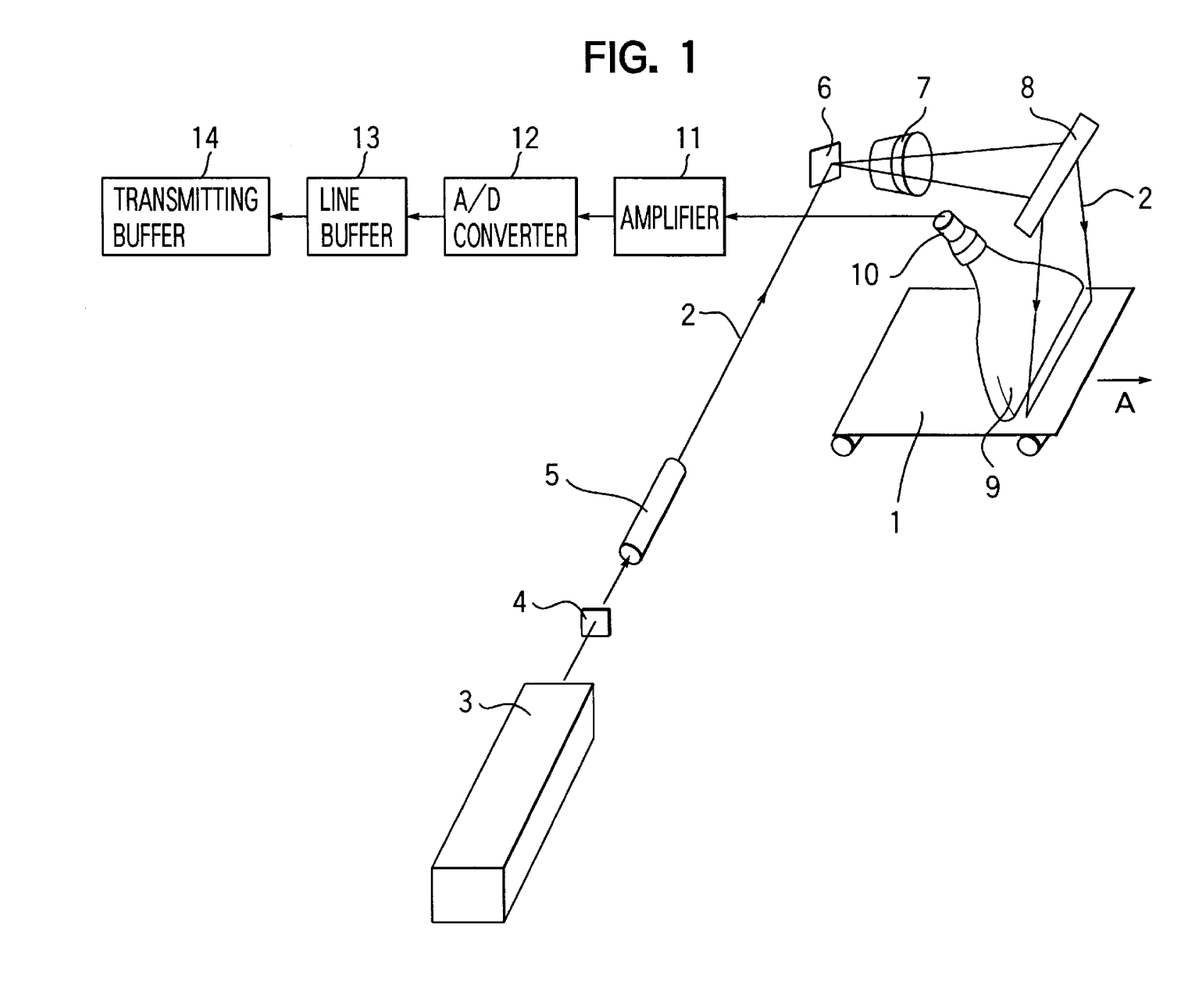
FIG. 1 is a schematic perspective view showing an image reading apparatus for producing image data to be analyzed by an autoradiographic image analyzing apparatus which is an embodiment of the present invention.

A stimulable phosphor sheet 1 shown in FIG. 1 stores locational information regarding radioactive labeling material contained in a specimen (not shown) in the form of radioactive energy. In this embodiment, the stimulable phosphor sheet 1 stores locational information regarding a radioactively labeled substance contained in DNA distributed by electrophoresis. Locational information as termed here includes a variety of information relating to the location of radioactive labeled substances, or aggregations thereof, present in a specimen, such as the location, the shape, the concentration, the distribution or combinations thereof.

The stimulable phosphor sheet which stores the locational information regarding a radioactive material in the specimen in this manner is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an f θ lens 7 and is reflected by a plane reflecting mirror 8, thereby impinging upon the stimulable phosphor sheet 1. The f θ lens 7 ensures that the stimulable phosphor sheet 1 is always scanned with the laser beam 2 at a uniform beam speed.

The stimulable phosphor sheet 1 is conveyed in the direction along the arrow in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image analyzing apparatus.

Figure 2:
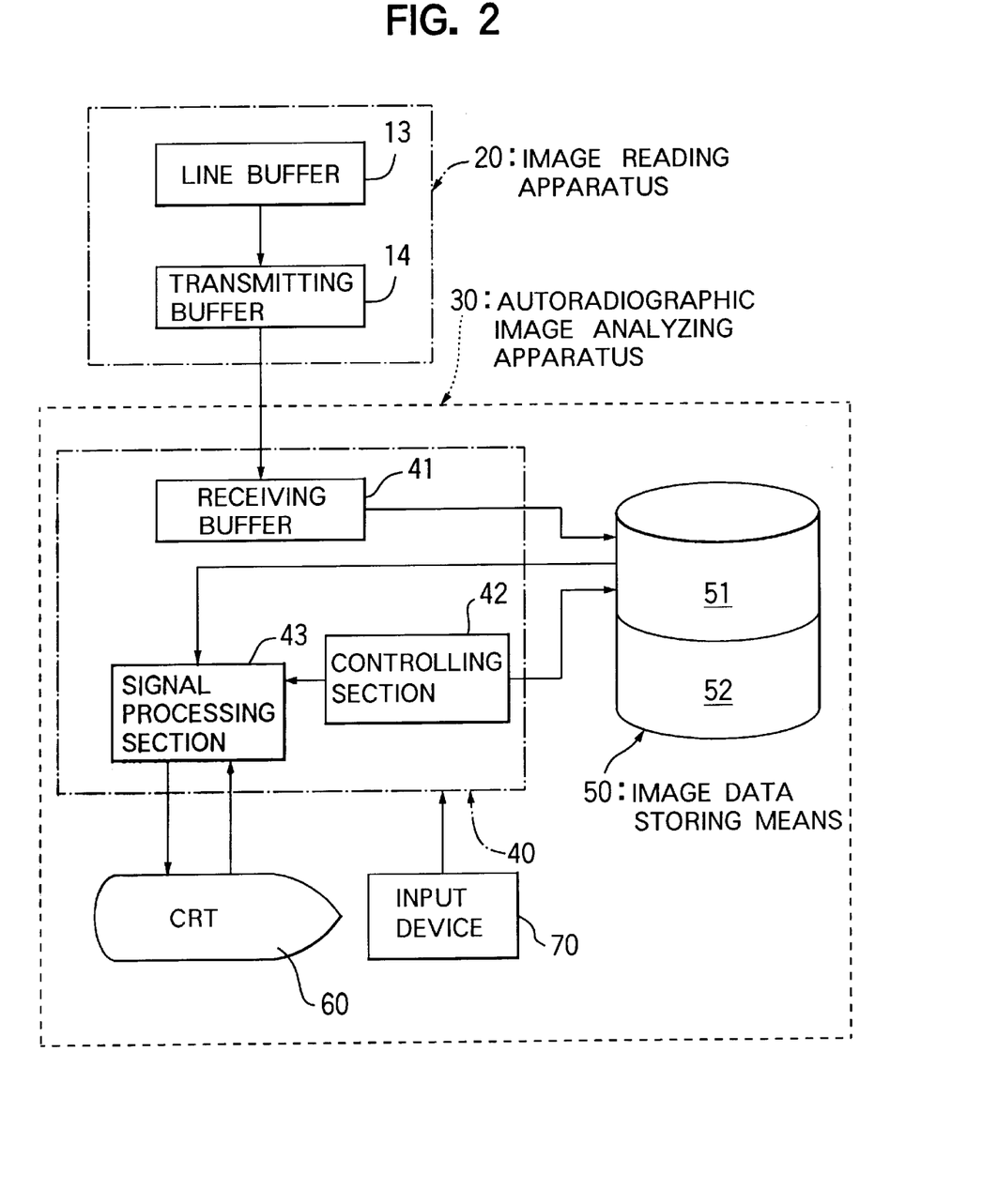
FIG. 2 is a block diagram of an autoradiographic image analyzing apparatus and an image reading apparatus.

FIG. 2 is a block diagram of the autoradiographic image analyzing apparatus and an image reading apparatus.

As shown in FIG. 2, the autoradiographic image analyzing apparatus 30 includes signal processing means 40 for receiving image data containing locational information regarding radioactive labeling material contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 50 for storing image data which were input to the signal processing means 40 from the image reading apparatus 20, a CRT 60 constituted so as to display images in a main window and a plurality of sub-windows for reproducing an image based on the image data containing locational information regarding radioactive labeling material contained in a specimen, and an input device 70 to which an operator can input desired data.

The image data temporarily stored in the transmitting buffer 14 of the image reading apparatus 20 are input to a receiving buffer 41 in the signal processing means 40 of the autoradiographic image analyzing apparatus 30 and temporarily stored therein. When a predetermined amount of the image data have been stored in the receiving buffer 41, the stored image data are output to an image data temporary storing section 51 in the image data storing means 50 and stored therein. In this manner, the image data fed from the transmitting buffer 14 of the image reading apparatus 20 to the receiving buffer 41 of the data processing means 40 and temporarily stored therein are further fed from the receiving buffer 41 to the image data temporary storing section 51 in the image data storing means 50 and stored therein. When the image data obtained by scanning the whole surface of the stimulable phosphor sheet 1 with the laser beam 2 have been stored in the image data temporary storing section 51 in the image data storing means 50, a controlling section 42 in the signal processing means 40 reads the image data from the image data temporary storing section 51 and after the image data have been subjected to necessary signal processing, it stores them in an image data storing section 52 in the image data storing means 50.

The image data stored in the image data storing section 52 in the image data storing means 50 can be read by a signal processing section 43 in accordance with the instructions of the controlling section 42 and displayed on the screen of the CRT 60.

Figure 3:
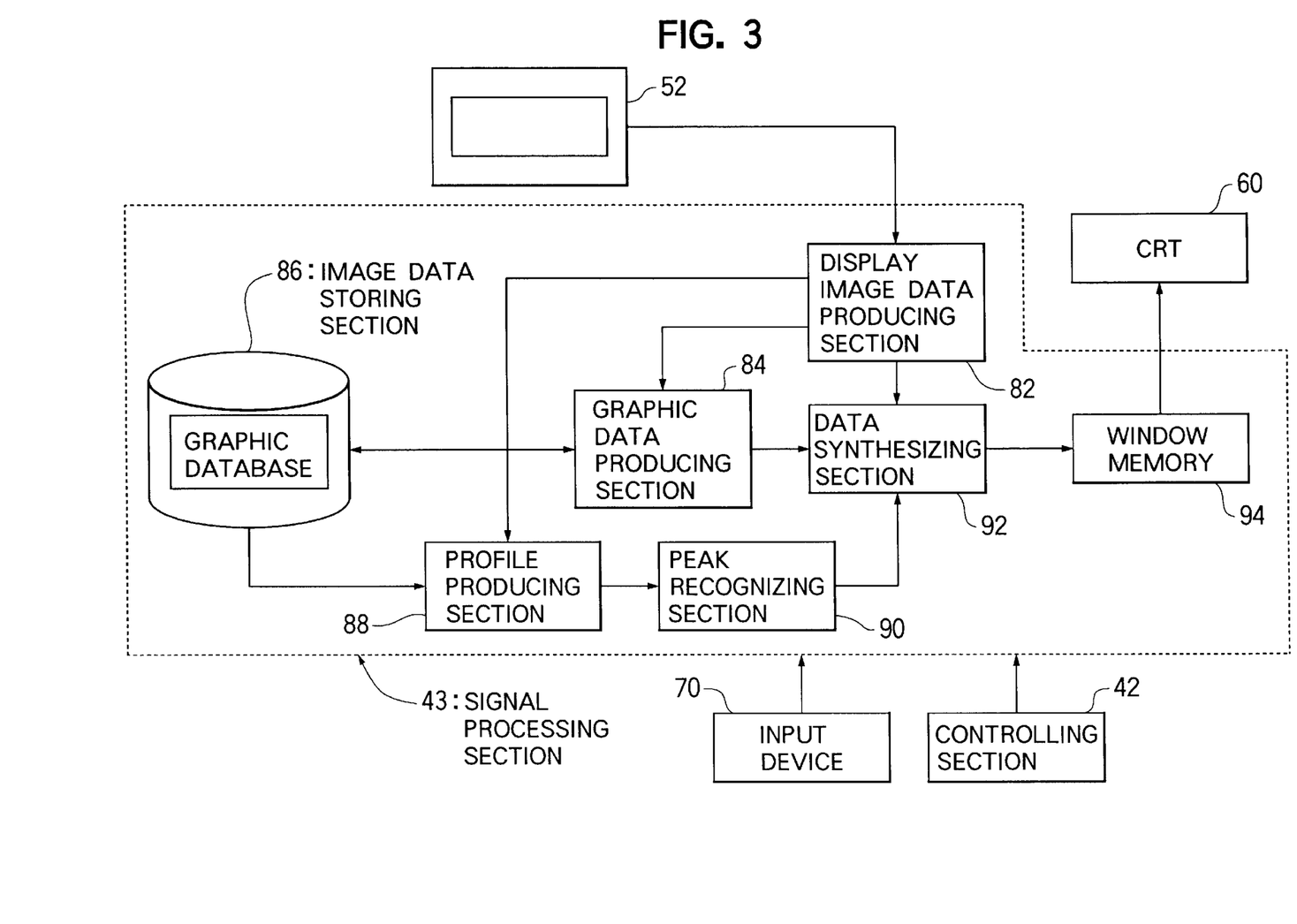
FIG. 3 is a block diagram of signal processing section of an image analyzing apparatus which is an embodiment of the present invention and a peripheral circuit associated therewith.

FIG. 3 is a block diagram of the signal processing section 43 used in the embodiment of the present invention and peripheral circuits associated therewith.

As shown in FIG. 3, the signal processing section 43 includes a display image data producing section 82 for reading image data stored in a predetermined area in the image data storing section 52, temporarily storing them and effecting predetermined processing thereon to produce display image data to be displayed on the CRT 60, a graphic data producing section 84 for producing graphic data including position data for defining positions by figures such as a line set by an operator using the input device 70, a graphic data storing section 86 for storing graphic data produced by the graphic data producing section 84, a profile data producing section 88 for reading predetermined image data from among the image data temporarily stored in the display image data storing section 82 and producing profile data corresponding to a profile obtained by one-dimensionally mapping the read image data, a peak recognizing section 90 for recognizing peaks of a profile curve obtained based on the profile data produced by the profile data producing section 88 and producing peak data indicating the peaks, an image data synthesizing section 92 for producing first synthesized image data based on the display image data produced by the display data producing section 82 and the graphic data produced by the graphic data producing section 84 and second synthesized image data based on the profile data produced by the profile data producing section 88 and the peak data produced by the peak recognizing section 90, and a window memory 94 for mapping the first synthesized image data and the second synthesized image data.

The display image data producing section 82 reads image data stored in a predetermined area in the image data storing section 52 in accordance with instructions entered through the input device 70 by an operator. In this embodiment, each image data unit constituting the image data, namely, a data value corresponding to one pixel, can have is any value between 0 and 4095. On the other hand, a display image data unit corresponding to one pixel to be displayed on the CRT 60 can have any value between 0 and 255, namely, a gray level. Therefore, the display image data producing section 82 converts the respective image data units having values of 0 to 4095 to display image data units constituted of gray levels of 0 to 255 in accordance with a data conversion table (not shown) and produces display image data constituted of display image data units for output to the image data synthesizing section 92. As described later, no data is output from the graphic data producing section 84, the profile data producing section 88 and the peak recognizing section 90 before a desired figure is set in an image displayed on the screen of the CRT 60 using an input device 70 such as a mouse. Therefore, at this time, the display image data is output as first synthesized image data from the image synthesizing section 92 to the window memory 94 and an image corresponding to the display image data is reproduced in the main window on the screen of the CRT 60.

When a figure having desired shape and size is drawn at a desired position in the image displayed in the main window on the screen of the CRT 60, the graphic data producing section 84 assigns a figure number to the figure and stores graphic data including figure kind data indicating the kind of the figure and position data indicating the position of the figure in a area corresponding to the figure number in a graphic database in the graphic data storing section 86. Figures to be specified and drawn in the image displayed in the main window on the screen of the CRT 60 include at least a straight line and rectangle. Further, the graphic data produced by the graphic data producing section 84 are output to the image data synthesizing section 92.

Based on the graphic data stored in the predetermined area in the graphic database in the graphic data storing section 86, the profile data producing section 88 reads image data corresponding to pixels in a region defined by the figure drawn in an image displayed in the main window on the screen of the CRT 60 from the image data temporarily stored in the display image data producing section 82 and produces profile data corresponding to a profile of values of image data units constituting the read image, namely, density values of the respective pixels, and outputs them to the image data synthesizing section 92 and the peak recognizing section 90. For example, in the case where a straight line is drawn as a figure in an image, the profile is produced by plotting values of image data units corresponding to pixels present on the straight line on an axis corresponding to the straight line. On the other hand, if a rectangle is drawn as a figure in an image, a profile is produced by summing up the values of image data units corresponding to pixels present in the direction of the short edges of the rectangle among pixels in the region defined by the rectangle and plotting the sum value on an axis corresponding to a long edge of the rectangle.

Figure 4:
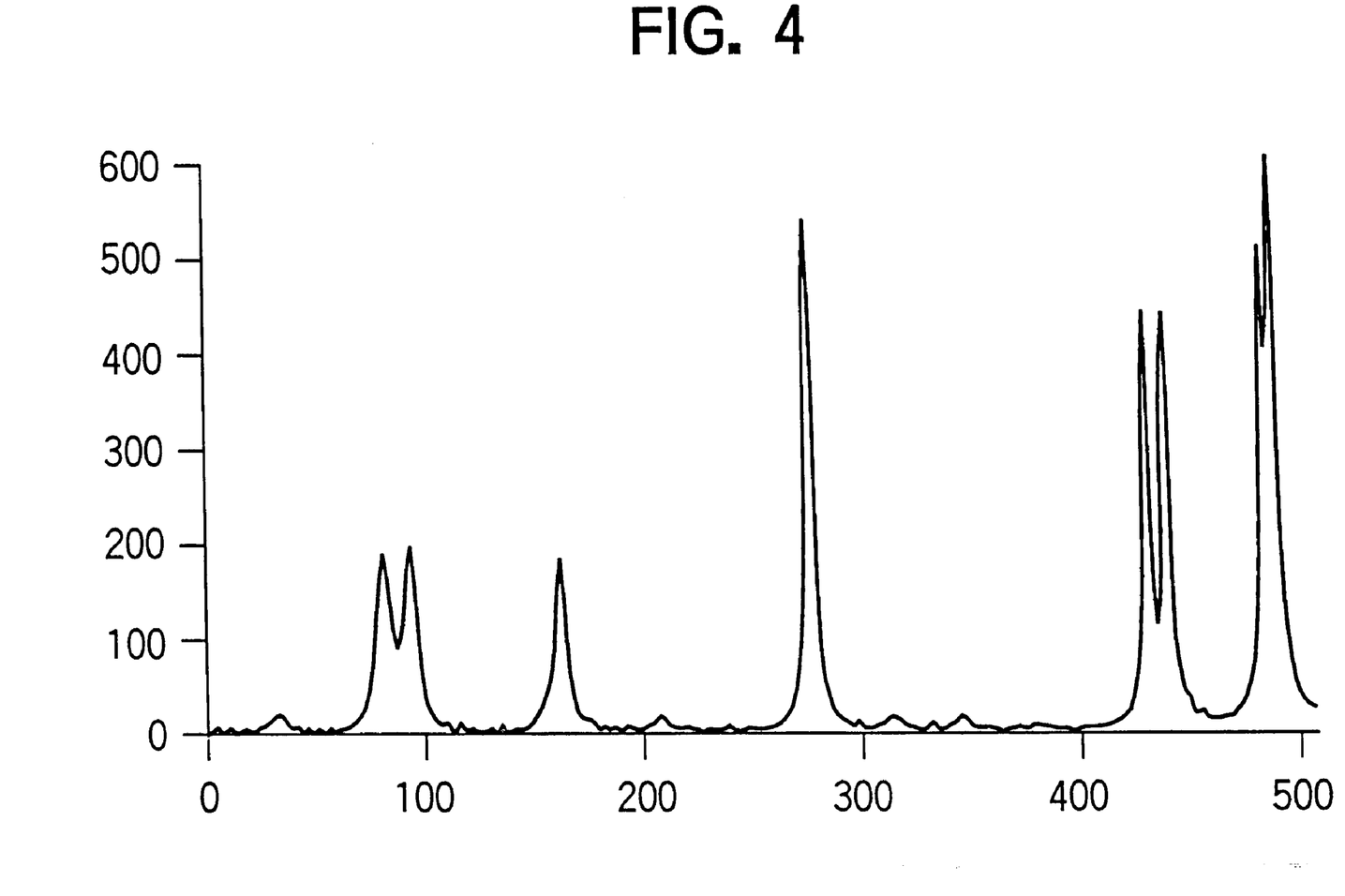
FIG. 4 is a graph showing one example of a profile curve produced by drawing a straight line in a predetermined region in an autoradiographic image of a radioactively labeled substance contained in DNA and distributed by electrophoresis, and displayed in a sub-window on the screen of a CRT.

The profile data produced by the profile data producing section 88 are output to the image data synthesizing section 92 and then mapped in the window memory 94 to be displayed in a predetermined sub-window on the screen of the CRT 60. FIG. 4 shows one example of a profile displayed in the sub-window on the screen of the CRT 60, which was produced by drawing a straight line in a predetermined region in an autoradiographic image of a radioactively labeled substance contained in DNA and distributed by electrophoresis. The operator can observe a graph indicating change in the density values of pixels by producing the profile in this manner.

Figure 5:
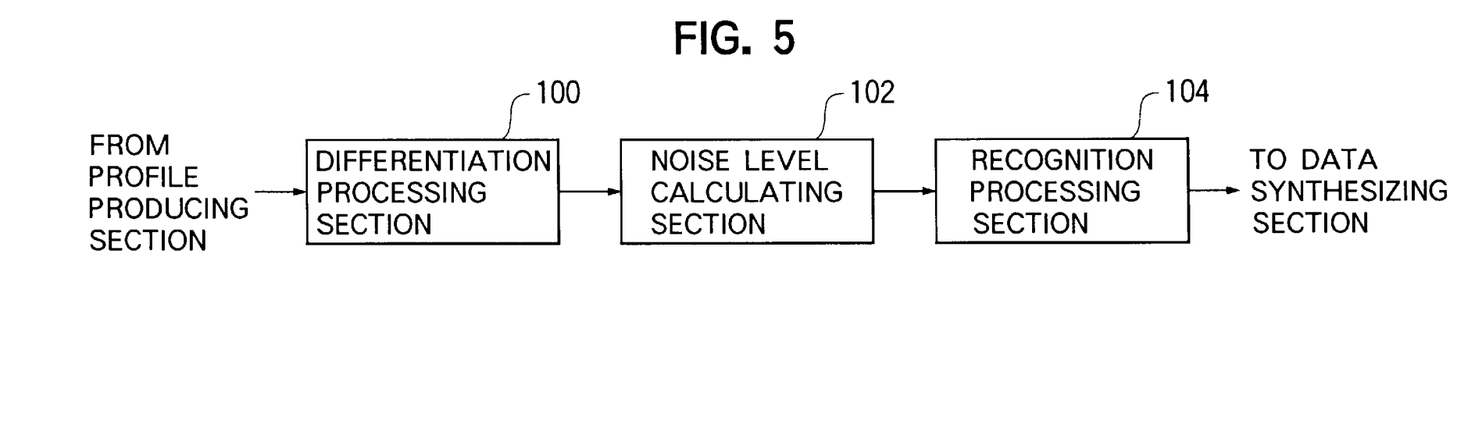
FIG. 5 is a block diagram showing a configuration of a peak recognizing section.

As shown in FIG. 5, the peak recognizing section 90 includes a differentiation processing section 100 for differentiating a profile curve obtained from the profile data and producing differential data based on which a differential curve can be obtained, a noise level calculating section 102 for producing noise level data indicating the level of noise contained in the profile based on the differential curve, and a recognition processing section 104 for effecting smoothing differential processing on the profile curve based on the noise level data to produce smoothed differential data based on which a smoothed differential curve can be obtained and recognizing peaks in the profile curve based on the smoothed differential curve.

The noise level calculating section 102 calculates the number of cross points where the differential curve crosses an axis corresponding to a straight line or a long edge of a rectangle drawn in an image and the number of pixels present on the axis and calculates pixel cross point numbers indicating the number of cross points present in each pixel based thereon. then, the noise level calculating section 102 judges what level the thus calculated pixel cross point number belongs to and produces the noise level data based on this judgment to output them to the recognition processing section 104.

In this embodiment, four levels are determined based on the pixel cross point number and first noise level data, second noise level data, third noise level data and fourth noise level data can be output from the noise level data calculating section 102 to the recognition processing section 104.

The recognition processing section 104 determines how to recognize peaks of the profile. In this embodiment, the recognition processing section 104 is constituted so as to be able to effect four kinds of processing depending on the four kinds of noise level data. More specifically, when the first noise level data is input, the recognition processing section 104 recognizes peaks based on the differential curve produced by the differentiation processing section 100 without effecting smoothing differentiation on the profile curve. When the second noise level data is input, the recognition processing section 104 effects seven-point smoothing differentiation on the profile curve and recognizes peaks based on the thus obtained smoothed differential curve. When the third noise level data is input, the recognition processing section 104 effects thirteen-point smoothing differentiation on the profile curve and recognizes peaks based on the thus obtained smoothed differential curve. When the fourth noise level data is input, the recognition processing section 104 effects seventeen-point smoothing differentiation on the profile curve and recognizes peaks based on the thus obtained smoothed differential curve.

Further, the recognition processing section 104 assigns peak numbers to peaks in the order from the peaks first recognized to that last recognized and produces peak data indicating the peak numbers and peak positions to output to the image data synthesizing section 92.

The image data synthesizing section 92 produces first synthesized image data by synthesizing display image data and graphic data and second synthesized image data by synthesizing profile data and peak data and maps the first and second synthesized image data in the window memory 94. An image corresponding to the first synthesized image data is displayed in the main window on the screen of the CRT 60 and an image corresponding to the second synthesized image data in the sub-window on the screen of the CRT 60.

The operation of the thus constituted image analyzing apparatus will be described.

When an operator gives predetermined instructions using the input device 70, image data stored in a predetermined area in the image data storing section 52 are read by the display image data producing section 82 and temporarily stored therein. The display image data producing section 82 produces display image data based on the image data and outputs them to the image data synthesizing section 92. As described above, since no graphic data have yet been input from the graphic data storing section 84 to the image data synthesizing section 92 at this time, the image data synthesizing section 92 outputs the display image data to the window memory 94, whereby an image corresponding to the display image data is displayed in the main window on the screen of the CRT 60.

Then, when the operator inputs instructions using the input device 70 such as a mouse to request that a figure having desired shape and size should be drawn at a desired position in the image displayed in the main window on the screen of the CRT 60, the graphic data producing section 84 assigns a figure number to the figure, produces graphic data including figure kind data indicating the kind of the figure and position data and, stores them in an area corresponding to the figure number in the graphic database in the graphic data storing section 86. Simultaneously, the graphic data producing section 84 outputs the graphic data to the image data synthesizing section 92. The image data synthesizing section 92 synthesizes the display image data and the graphic data, whereby the figure specified by the operator is displayed in the image displayed in the main window on the screen of the CRT 60 and the figure number assigned by the graphic data producing section 84 is also displayed in the image.

Further, when the operator inputs instructions using the input device 70 to request that a profile of the region defined by the figure to which the figure number has been assigned be produced, the profile producing section 88 reads graphic data from the area corresponding to the figure number in the graphic database in the graphic data storing section 86 and image data corresponding to the pixels in the region defined by the figure from the image data storing section 52 and produces profile data based thereon.

Figure 6:
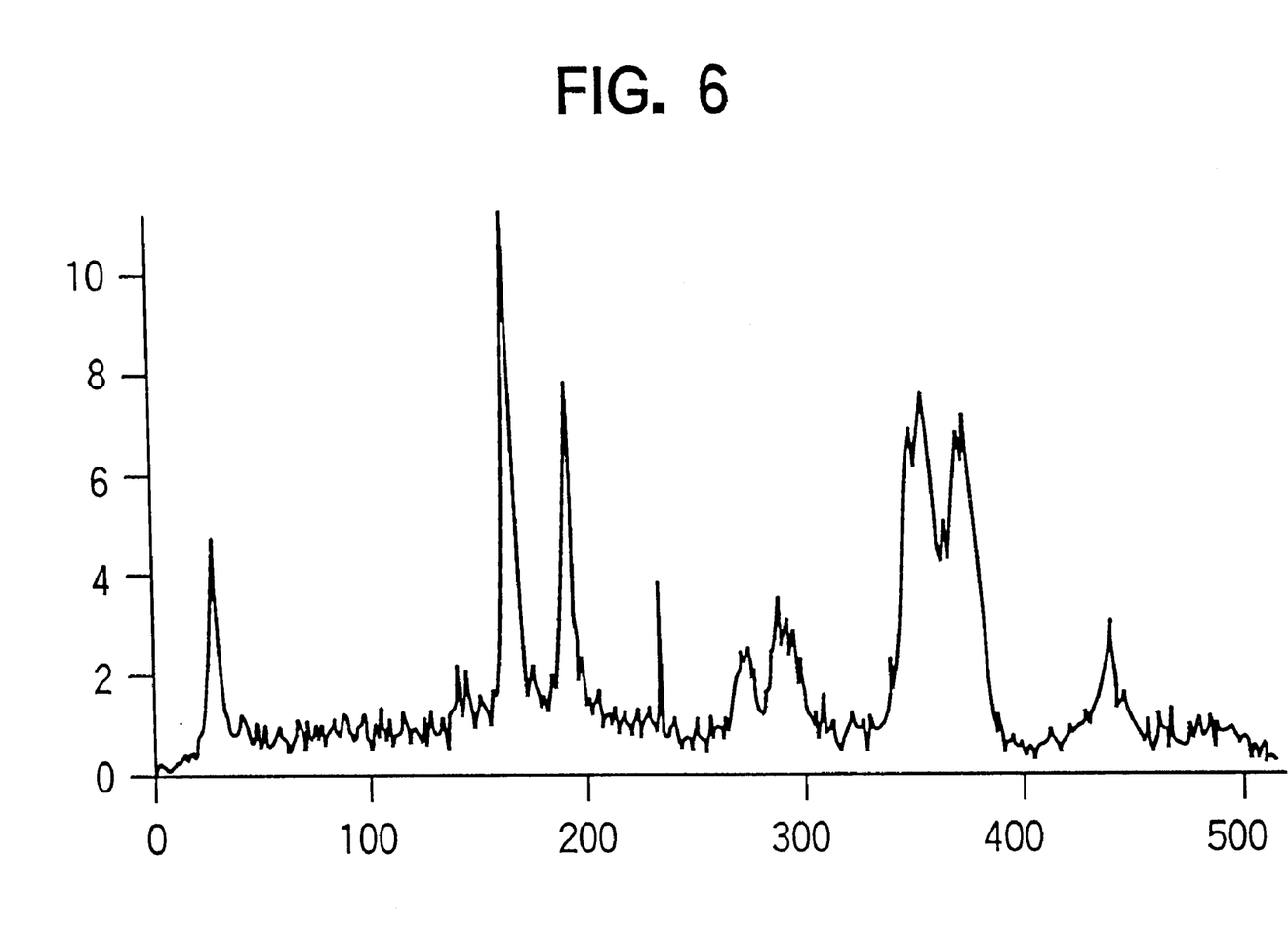
FIG. 6 is a graph showing another example of a profile curve produced by drawing a straight line in a predetermined region in an autoradiographic image of a radioactively labeled substance contained in DNA and distributed by electrophoresis, and displayed in a sub-window on the screen of a CRT.

FIG. 6 shows another example of a profile displayed in the subwindow on the screen of the CRT 60, which was produced by drawing a straight line in a predetermined region in an autoradiographic image of a radioactively labeled substance contained in DNA and distributed by electrophoresis. It can be seen from FIGS. 4 and 6 that the noise levels of the image from which the profile shown in FIG. 6 was produced are much greater than those of the image from which the profile shown in FIG. 4 was produced.

Figure 7:
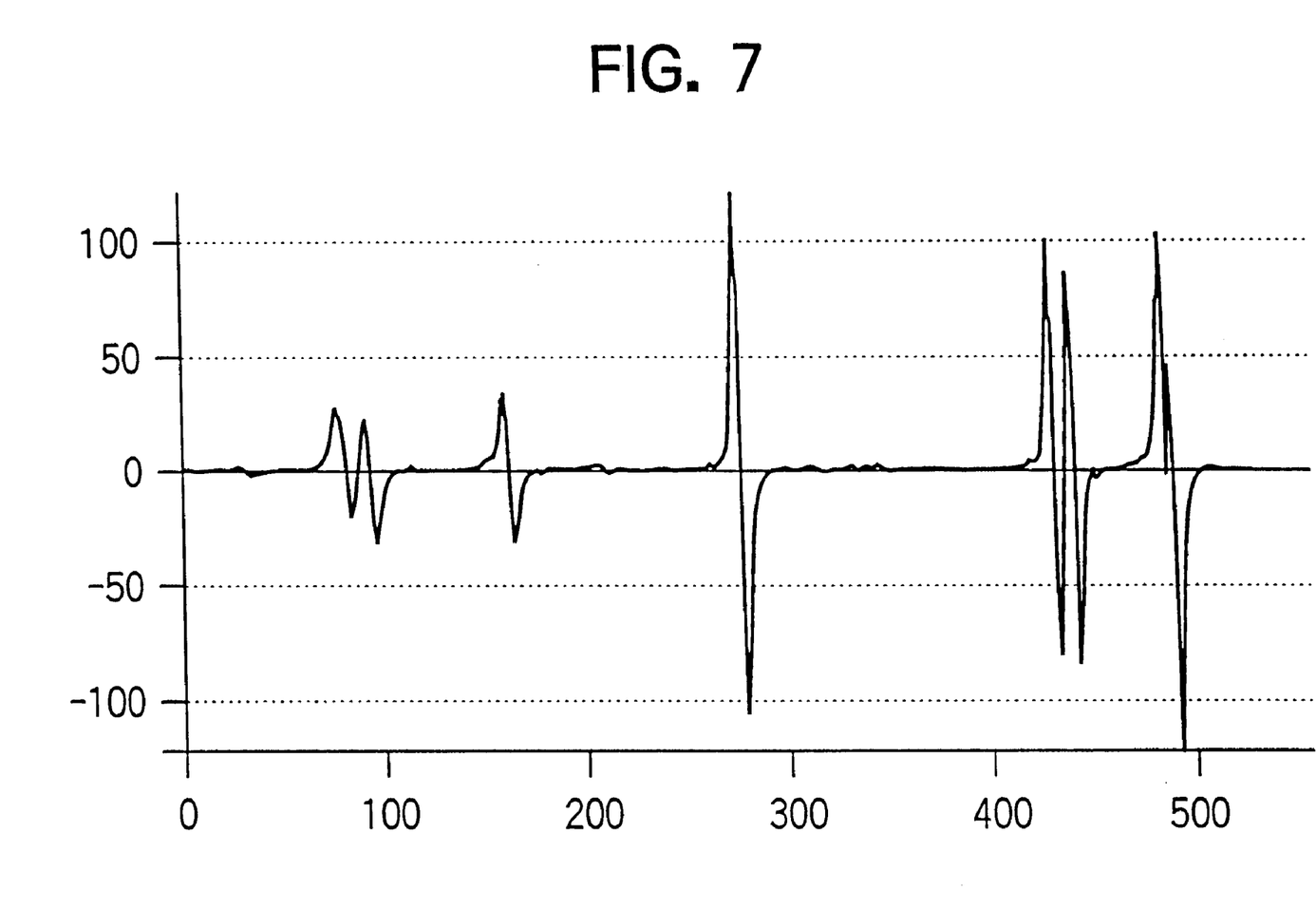
FIG. 7 is a graph showing a differential curve obtained by differentiating the profile curve shown in FIG. 4.
Figure 8:
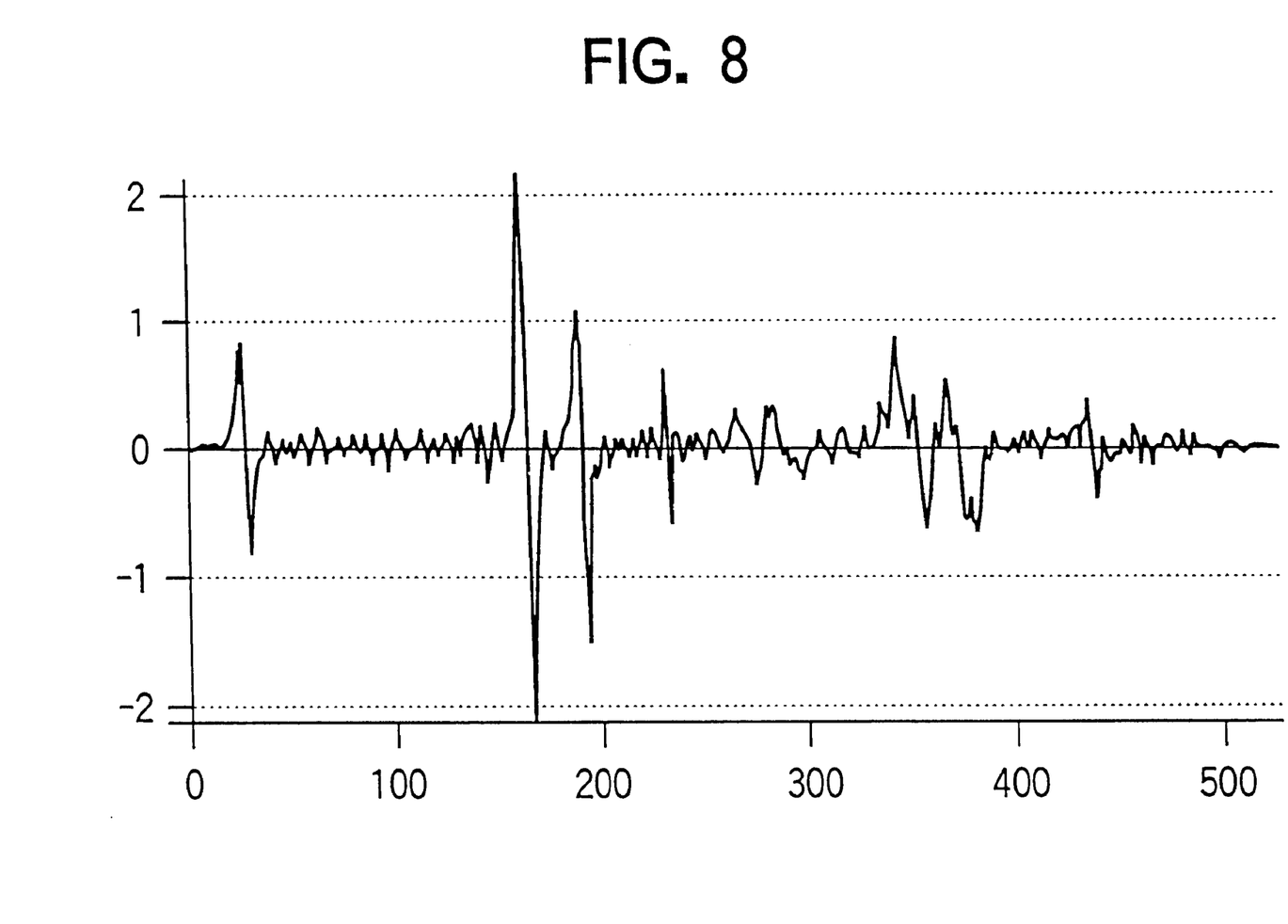
FIG. 8 is a graph showing a differential curve obtained by differentiating the profile curve shown in FIG. 6.

Then, when the operator inputs instructions using the input device 70 to request that the peaks of the profile be recognized, the peak recognizing section 90 reads profile data from the profile producing section 88 and the differentiation processing section 100 of the peak recognizing section 90 differentiates a profile curve obtained based on the profile data to produce differential data from which a differential curve can be obtained. FIG. 7 shows a differential curve corresponding to the profile shown in FIG. 4 and FIG. 8 shows a differential curve corresponding to the profile shown in FIG. 6.

The differential data produced by the differentiation processing section 100 are input to the noise level calculating section 102 and the noise level calculating section 102 produces noise level data based on the differential data. For example, since the noise levels of the profile shown in FIG. 6 are much greater than those of the profile shown in FIG. 4, fourth noise level data are produced based on the pixel cross point number calculated from the differential curve shown in FIG. 8, while first noise level data are produced based on the pixel cross point number calculated from the differential curve shown in FIG. 7. The thus calculated noise level data are output from the noise level calculating section 102 to the recognition processing section 104.

Then, the recognition processing section 104 determines how to recognize the peaks of the profile based on the noise level data input from the noise level calculating section 102. When the first noise level data calculated from the differential curve shown in FIG. 7 are input to the recognition processing section 104, the recognition processing section 104 recognizes the peaks based on the differential curve shown in FIG. 7 by detecting cross points where the differential curve crosses an axis corresponding to a straight line or a long edge of a rectangle drawn in an image without effecting smoothing differentiation on the profile curve. On the other hand, when the fourth noise level data calculated from the differential curve shown in FIG. 8 are input to the recognition processing section 104, the recognition processing section 104 effects seventeen-point smoothing differentiation on the profile curve and recognizes the peaks based on the thus obtained smoothed differential curve by detecting the cross points.

The recognition processing section 104 assigns peak numbers to the recognized peaks and produces peak data indicating the peak numbers and their positions, and outputs them to the image data synthesizing section 92.

The image data synthesizing section 92 produces second synthesized image data by synthesizing the profile data and the peak data so that the thus recognized peaks and their peak numbers are contained in the profile corresponding to the profile data and maps them in the window memory 94.

Therefore, a profile image including the peaks and their peak numbers is displayed in the sub-window on the screen of the CRT 60.

Figure 9:
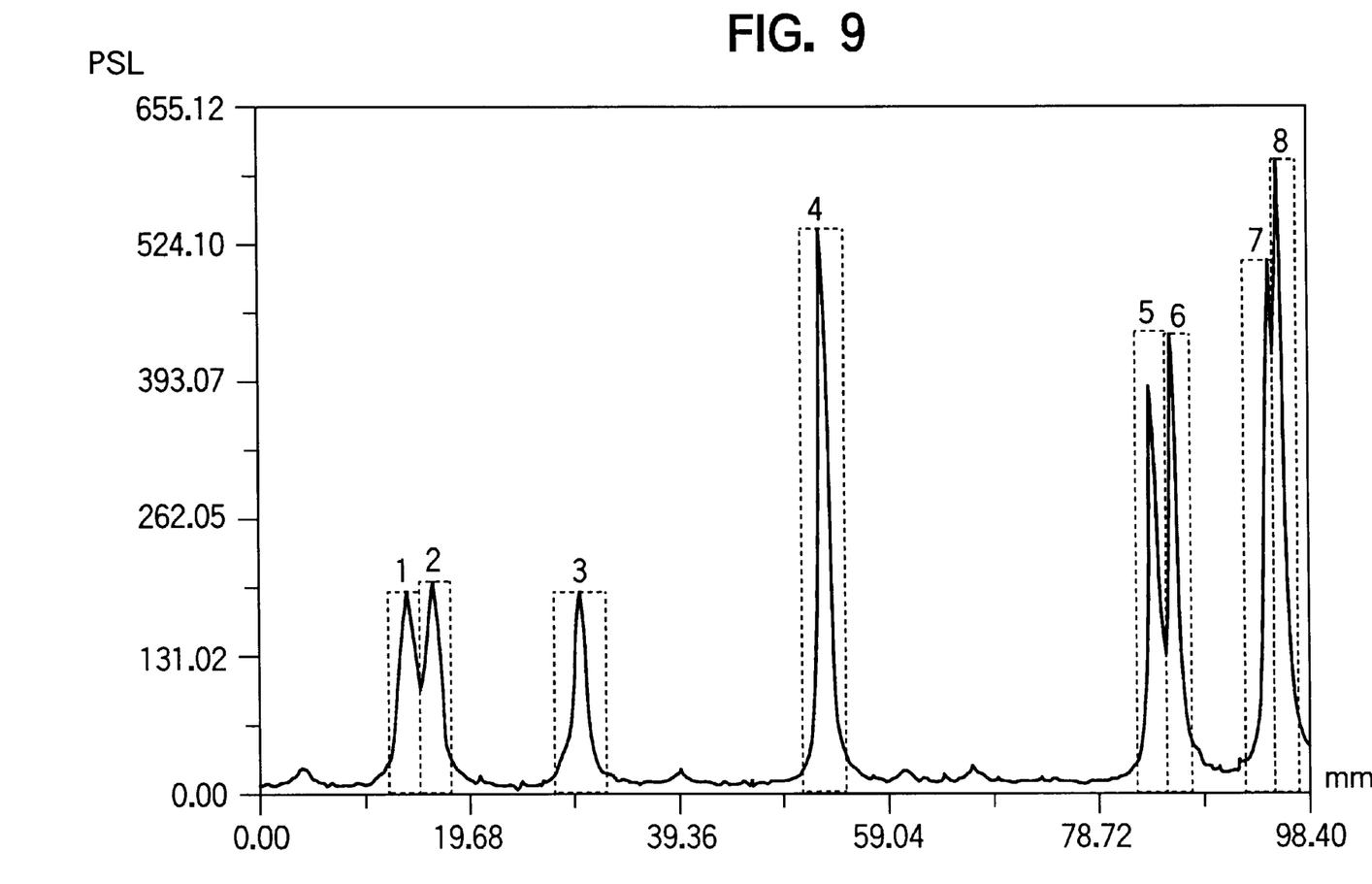
FIG. 9 is a graph showing a profile image produced based on the profile curve shown in FIG. 4, including peaks and their peak numbers and displayed in a sub-window on the screen of a CRT.
Figure 10:
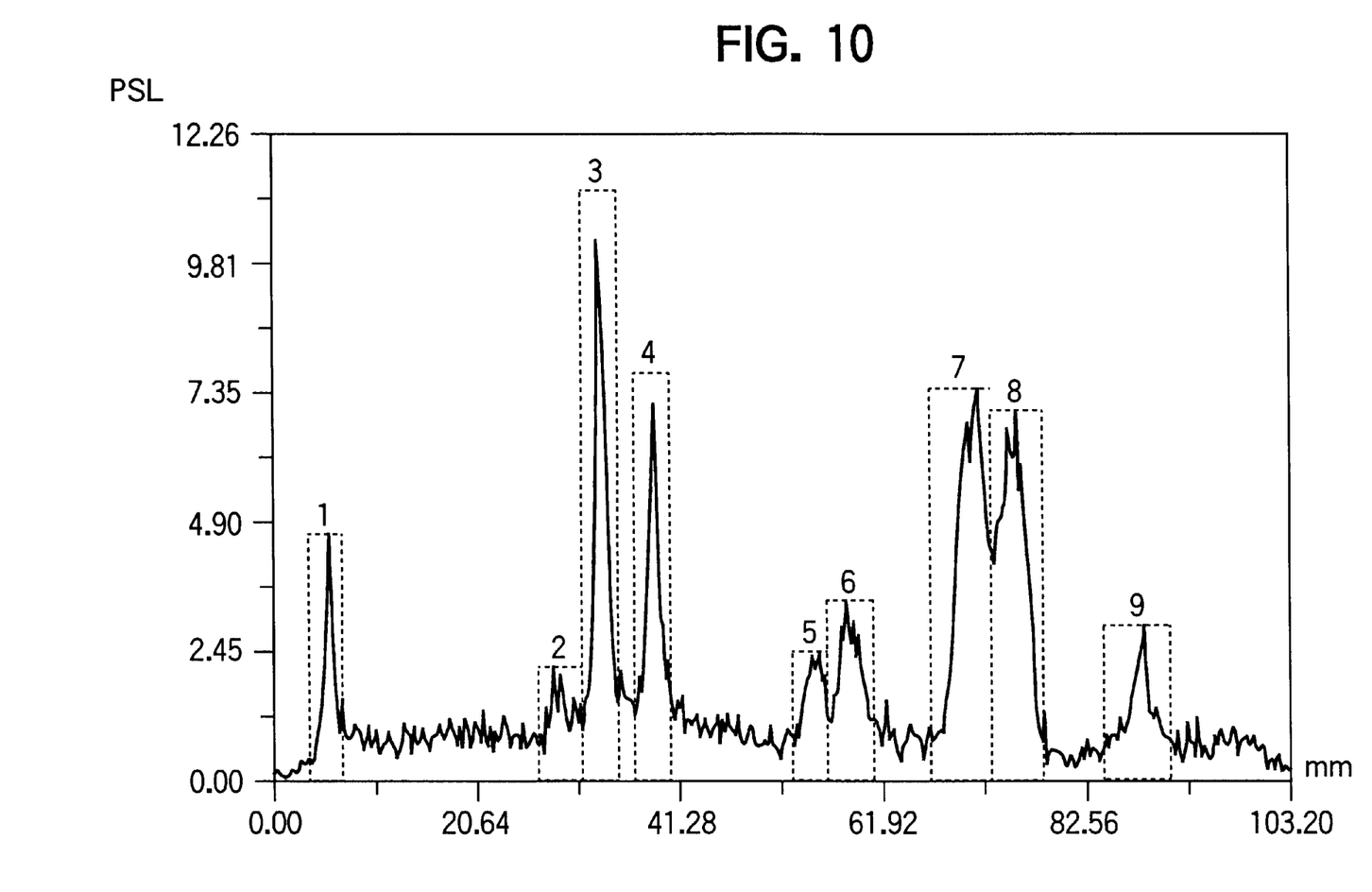
FIG. 10 is a graph showing a profile image produced based on the profile curve shown in FIG. 6, including peaks and their peak numbers, and displayed in a sub-window on the screen of a CRT.

FIG. 9 is a graph showing a profile image produced based on the profile shown in FIG. 4, including the peaks and their peak numbers, and displayed in the sub-window on the screen of the CRT 60, and FIG. 10 is a graph showing a profile image produced based on the profile shown in FIG. 6, including the peaks and their peak numbers, and displayed in the sub-window on the screen of the CRT 60. As will be understood from FIGS. 9 and 10, peaks can be properly recognized for both profiles having relatively little noise and profiles having a lot of noise.

According to the above described embodiment, the differentiation processing section 100 of the peak recognizing section 90 calculates a differential curve by differentiating the profile curve and the noise level calculating section 102 judges the level of noise contained in the profile curve based on the differential curve. Further, the recognition processing section 104 recognizes peaks of the profile curve by effecting smoothing differentiation on the profile curve or without effecting smoothing differentiation on the profile curve, depending on the level of the noise. Therefore, it is possible to properly obtain peaks irrespective of how much noise an image contains, namely, how much noise a profile contains.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the description is made as to determining peaks of a density profile of pixels in a region defined by a figure drawn by an operator in an autoradiographic image displayed on the screen of the CRT 60 and indicating the locational information regarding a radioactively labeled substance contained in DNA distributed by electrophoresis. However, the present invention is not limited to such an autoradiographic image and can also be applied to autoradiographic images such as an autoradiographic image of a gene obtained by the Southern blot-hybridization method, an autoradiographic image of a protein produced by thin layer chromatography (TLC), an autoradiographic image produced by polyacrylamide gel electrophoresis for the separation or identification of a protein or the estimation of the molecular weight or properties of a protein, an autoradiographic image for studying the metabolism, absorption, excretion path and state of a substance introduced into a test mouse, or the like. Further, the present invention is applicable for analyzing chemiluminescent images produced by a chemiluminescent process such as a chemiluminescent image of a gene produced by the Southern blot hybridization method, a chemiluminescent image of a protein produced by thin layer chromatography, a chemiluminescent image produced by polyacrylamide gel electrophoresis for the separation or identification of a protein or the estimation of the molecular weight or properties of a protein or the like. Furthermore, the present invention can be widely applied to the analysis of an electron beam transmission image or an electron beam diffraction image of a metal or nonmetal produced by an electron microscope, an electron beam image of tissue of an organism and a radiographic diffraction image of a metal or nonmetal. Moreover, the present invention can be applied not only autoradiographic, chemiluminescent, electron beam transmission and electron beam diffraction images but to any image wherein it is necessary to determine the peaks of the density profile of pixels in a region defined by a figure in the image.

Further, in the above described embodiments, the differentiation processing section 100 of the peak recognizing section 90 differentiates the profile curve to produce differential data from which a differential curve can be obtained. However, the differentiation processing section 100 may effect three-point smoothing differentiation, five-point smoothing differentiation or the like on the profile curve to produce smoothed differential data and output them to the noise level calculating section 102.

Furthermore, in the above described embodiment, although the recognition processing section 90 effects smoothing differentiation on the profile curve in accordance with the noise level data, other processing may be effected by the recognition processing section 90. For example, the recognition processing section 90 may be constituted so as to change the extent of smoothing of the profile curve, namely, the extent of integration, in accordance with the noise level data for preventing peaks from being erroneously recognized, integrate the profile curve in accordance with the thus determined extent, differentiate the integrated profile curve and recognize peaks based on the differentiated profile curve.

Further, although the above embodiment was described taking a straight line and a rectangle as examples, a hooked line, a curve or the like may be displayed to define a region in an image and graphic data may be produced based on figures including these figures.

Moreover, in the above described embodiment, although the image data are produced by using the stimulable phosphor sheet 1 and converting locational information regarding a radioactive labeling substance to an electrical signal and are displayed on the CRT 60 as a visible image, it is possible to once form a visible image on a photographic film instead of the stimulable phosphor sheet 1, photoelectrically read the visible image, convert it to an electrical signal and process the thus obtained image data in a similar manner to the above.

Furthermore, in the above described embodiments, although an image is displayed on a CRT 60, it may be displayed on any of various display means other than a CRT 60.

Further, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image analyzing apparatus which can automatically and properly recognize peaks in a profile irrespective of noise contained in the image.

We claim:

1. An image analyzing apparatus comprising:

display means for displaying an image;

profile data producing means for producing profile data corresponding to a profile of density in a region specified by a figure formed at a desired position in the image displayed on the display means;

noise level data producing means for producing noise level data indicating a level of noise contained in the profile by differentiating a profile curve corresponding to the profile to generate a differential curve and generating the noise level data based on the number of cross points per unit distance where the differential curve crosses a zero level; and peak recognizing means for smoothing the profile data in accordance with the noise level data Produced by said noise level data producing means and producing peak data regarding peaks contained in the profile based on the smoothed profile data, wherein the display means displays the profile.

2. An image analyzing apparatus in accordance with claim 1 wherein the peak recognizing means is constituted so as to effect smoothing differentiation on the profile curve corresponding to the profile.

3. An image analyzing apparatus in accordance with claim 2 wherein the peak recognizing means is constituted so as to recognize peaks by selecting, depending on the noise level data, either method based on a curve produced by effecting smoothing differentiation on the profile curve or based on the differential curve of the profile curve.

4. An image analyzing apparatus in accordance with claim 2 wherein the peak recognizing means is constituted so as to select, in accordance with the noise level data, points based on which smoothing differentiation is to be effected on the profile curve.

5. An image analyzing apparatus in accordance with claim 3 wherein the peak recognizing means is constituted so as to select, in accordance with the noise level data, points based on which smoothing differentiation is to be effected on the profile curve.

* * * * *